June 10, 1969        J. W. MULLINS        3,448,758
REFRIGERANT SERVICE VALVE
Filed Nov. 4, 1966
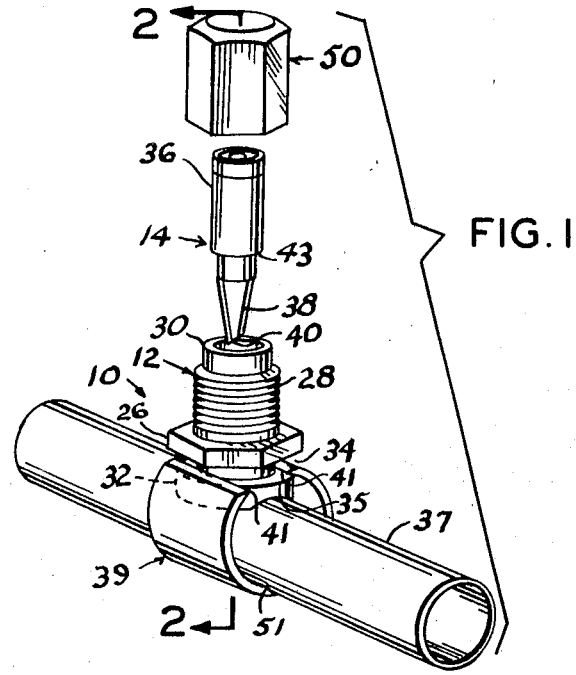
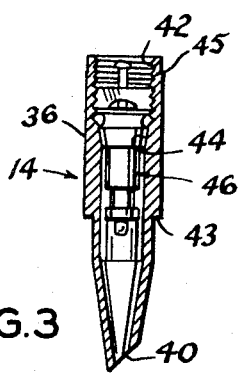
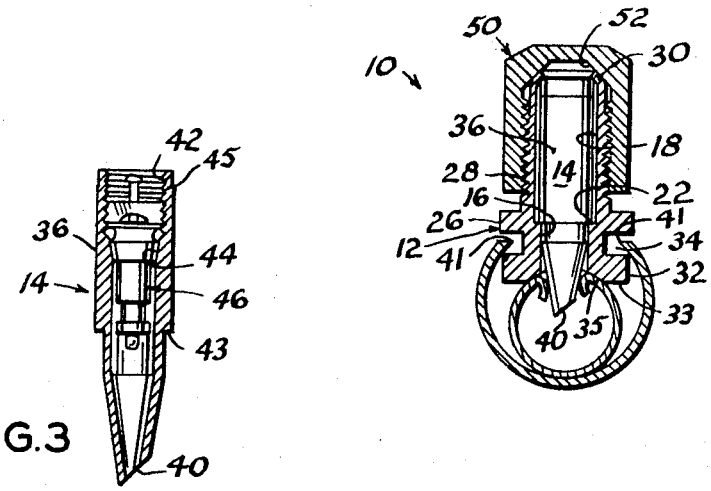
JOHN W. MULLINS
*INVENTOR.*
BY
*Robert K. Rhea*
AGENT

United States Patent Office 3,448,758
Patented June 10, 1969

3,448,758
REFRIGERANT SERVICE VALVE
John W. Mullins, Cooper, Tex.
(P.O. Box 20524, Oklahoma City, Okla. 73130)
Filed Nov. 4, 1966, Ser. No. 592,104
Int. Cl. F16l 41/06; F25b 45/00
U.S. Cl. 137—318          2 Claims

ABSTRACT OF THE DISCLOSURE

A generally cylindrical centrally bored and counter-bored housing, having external threads intermediate its ends is connected by one end portion to a line to be tapped by clamp means. A tubular core having a length slightly greater than the length of the housing and having a line piercing tip is provided with a valve opening and closing its bore and is freely received by the bore of the housing. A cap threadedly engaged with the housing moves the core longitudinally through the housing and forces the line piercing tip into a line and subsequently crimps the free end portion of the housing wall inwardly in overlapping locking relation against the adjacent end of the core.

---

The present invention is an improvement over my copending application for Refrigerant Service Valve, filed June 24, 1966, Ser. No. 560,282, now abandoned.

This invention is distinctive over the above application by the inclusion of a clamp for holding the housing on the line to be tapped and providing a locking seal between the valve equipped line tapping core and the surrounding housing.

Many sealed refrigerating systems are not provided with service valves on the high or low pressure refrigerant conductor line. It is highly desirable to provide a means for ascertaining the amount of refrigerant or lack of it contained by the system or to determine on which side of the compressor the trouble lies without disassembling the system.

It is, therefore, the principal object of the instant invention to provide a service valve which may be easily and permanently connected to a refrigerant conductor line on either the high or low pressure side of the compressor or on both sides.

Another object is to provide a service valve which may be easily connected with a wide range of sizes of refrigerant lines of existing sealed or open type refrigerant systems without the use of bolts, screws, soldering or brazing.

Another object is to provide a service valve housing and clamp means for connection with a refrigerant line including a valve equipped self-tapping core which is forced into the line by a housing cap or cover wherein the housing forms a locking seal with the end of the core opposite its line piercing tip.

An additional object is to provide a service valve which may be repeatedly used for adding refrigerant to or removing refrigerant from the system.

Still another object is to provide a service valve which is relatively small in overall dimensions thereby requiring very little additional space and rendering the valve adaptable for use in confined areas such as air-conditioners installed on automobiles, or the like.

Yet another object is to provide a service valve of this class for any line capable of being pierced as hereinafter described wherein the opening formed in the line is of sufficient size for freely passing gas or liquid therethrough.

The present invention accomplishes these and other objects by providing a housing and clamp adapted for connection with a refrigerant line or the like. The housing coaxially receives a valve equipped line tapping core in line piercing and sealing relation.

Other objects will be apparent from the following description when taken in conjunction with the accompanying single sheet of drawings, wherein:

FIGURE 1 is a perspective view of the service valve installed on a fragment of a refrigerant line and illustrating the self-tapping core and cap in exploded relation;

FIGURE 2 is a vertical cross-sectional view through the components of FIG. 1, after assembly on the line, taken substantially along the line 2—2 of FIG. 1; and FIGURE 3 is a vertical cross-sectional view through the line tapping core.

Like characters of reference designate like parts in those figures of the drawings in which they occur.

In the drawings:

The reference numeral 10 indicates the device, as a whole, comprising a housing 12 which freely receive a line tapping core 14. The housing 12 may be formed of brass or other suitable material and is cylindrical in general configuration having a central bore 16 and counter-bored from one end, as at 18, forming an annular shoulder 22. Intermediate its ends the periphery of the housing is provided with an outstanding hexagonal flange forming a wrench head 26. One end portion of the housing is externally threaded, as at 28, and diametrically reduced externally outwardly of its threads to form an end portion having a relatively thin wall 30. The other end portion of the housing is provided with a relatively thick annular flange 32 diametrically substantially equal with respect to the diameter across the flats of the wrench head 26. The flange 32 defines an abrupt end surface 33 perpendicular to the longitudinal axis of the housing. The flange 32 is spaced from the wrench head 26 forming an annular groove 34 a selected width. The housing end surface 33 is provided with a transverse recess 35 preferably formed on a radius substantially equal to an arc of the periphery of a refrigerant line 37 to be tapped. It is not essential that the recess 35 conform to an arc of the periphery of the line for the reason that no seal is to be formed thereby.

Clamp means connects the housing 12 to the line 37. The clamp means illustrated is formed from a section of metallic pipe 39 diametrically substantially greater than the diameter of the refrigerant line 37 and longitudinally substantially equal to the diameter of the flange 32. A longitudinally extending arc of the pipe is removed as by cutting or sawing along a secant line thus forming a C-shaped member when viewed in cross section (FIG. 2. The spacing between the opposing side edges 41 thus formed is preferably slightly greater than the diameter of the pipe 37 and less than the diameter of the flange 32.

The housing 12 is attached to the line 37 by an operator manually positioning the recess 35 on the line, with one hand while, with the other hand, the clamp 39 is positioned around the line 37 adjacent the housing. The clamp 39 is manually moved longitudinally of the line toward the housing so that the opposing side edges 41 of the clamp enter the groove 34. This loosely positions the housing on the line. Alternatively other clamp means may be used for securing the housing to the line, for example, a wire may be secured to the housing within the groove 34 and wrapped around the line to be tapped.

The core 14 is longitudinally slightly greater than the length of the housing 12 and is preferably formed of relatively hard tubular material, such as steel, and is characterized by a diametrically enlarged end portion 36 forming an annular external first shoulder 43 and having an opposite tapered or converging end portion 38. The length of the enlarged end portion 36 is slightly less than the spacing between the housing shoulder 22 and the free end surface of the housing wall 30. The length of the other end portion of the core, terminating with the tapered end portion 38, is such that the tip end of the tapered portion projects beyond the line contacting end surface 33 of the housing. The free end of the core tapered end portion 38 is beveled or cut off on an angle with respect to its longitudinal axis to form an ovate cutting edge surface or tip end 40 so that rotation of the core 14 about its longitudinal axis or when longitudinal force is applied to the core the tip performs a cutting and line piercing action. The enlarged end portion 36 of the core is internally threaded, as at 42, and provided with a seat 44 adjacent the inward limit of the threads for receiving a conventional tire valve core 46.

The core 14 is installed within the housing in line tapping relation by manually inserting the core, beveled end first, into the housing wherein the cutting surface 40 contacts the outer surface of the line 37 while the enlarged end portion 36 projects outwardly of the free end of the housing wall 30.

A cap or cover 50, having an outer hexagonal wrench engaging periphery, is placed over the free end portions of the housing 12 and core 14. The cap 50 is internally threaded for engagement with the housing threads 28. The internal threads of the cap terminate inwardly in a smooth beveled surface 52. The cap 50 is screwed, by using wrenches, not shown, onto the housing threads 28 thus forcing the core 14 toward the line 37, so that the core tip end 40 pierces the wall of the refrigerant line 37. A portion of the refrigerant line wall is forced inwardly (FIG. 2) and surrounds the tapered end portion 38 of the core in refrigerant gas sealing relation. As the cap 50 is screwed onto the housing threads 28 and the core shoulder 43 approaches the housing shoulder 22, the inner beveled surface 52 of the cap contacts the outwardly projecting end surface of the housing thin wall portion 30 and bends or crimps the free end portion of the relatively thin wall inward in overlapping relation with respect to the free end surface of the enlarged portion 36 of the core while simultaneously forcing the shoulder 43 of the core into contact with the housing shoulder 22. As shown more clearly in FIG. 3 the free end portion of the core enlarged portion 36 is preferably circumferentially reduced to form a second annular shoulder, as at 45, to increase the spacing between the periphery of the core and the inner surface of the wall 30 to enhance the above crimping and sealing action. This crimping action of the wall 30 against the core 14 locks the core within the housing and forms three refrigerant gas seals. The initial seal being the wedging action between the pierced wall of the refrigerant line 37 and the tapered surface 38 of the core and secondary seals between the housing shoulder 22 and core shoulder 43 and between the crimped end portion of the wall 30 and the free end surface of the core outwardly of the second shoulder 45. Simultaneous with the line piercing action the force applied to the core 14 imparts an opposite force to the housing which, being secured to the line 37 by the clamp 39, results in the clamp slightly flattening or inwardly upsetting a portion of the line wall, as at 51 (FIG. 1). This line flatting or crimping action is desirable in that it tends to maintain the clamp in proper position on the line.

OPERATION

In operation the device 10 is connected with the selected refrigerant line 37 as disclosed hereinabove. Refrigerant gas is added to the line 37 by removing the cap 50 and connecting a conventional valve depresser unit, connected with a source of gas, neither of which are shown, to the housing threads 28 wherein the valve depresser unit opens the tire valve core 46 for the admission of refrigerant gas. Obviously refrigerant gas may be removed from the line through the core 14 by simply removing the cap 50 and depressing the stem of the valve core 46.

I claim:

1. A self-tapping service valve for a tubular line, comprising: a generally cylindrical centrally bored housing having external threads intermediate its ends; clamp means connecting one end of said housing to a line to be tapped, said housing having a counterbore extending inwardly from its end oppoiste its line connected end forming an annular shoulder intermediate its ends and forming a relatively thin wall at its free end portion; a tubular core, having a length slightly greater than the length of said housing, freely received by the bore of said housing, said core having a tapered end portion converging outwardly of the housing at its line connected end, said tapered end portion terminating in a beveled end surface forming an ovate surfaced line penetrating tip, said core having an intermediate diametrically enlarged portion forming a first annular shoulder intermediate its ends for seating on the annular shoulder within said housing and forming a second annular shoulder spaced inwardly of the outer end surface of said relatively thin wall of said housing when the core is placed therein, said core having internal threads at its end portion opposite its tapered end portion and having a seat formed on its inner wall surface at the inward limit of its threads; an air valve sealing with the seat in said core; and a cap engaging the threads on said housing, said cap having a beveled inner end surface contacting the adjacent outwardly disposed end surface of said core and forcing the penetrating end surface of said core into a line to be tapped and subsequently contacting the outer end surface of said relatively thin wall of said housing and forcing the latter inwardly against and over the adjacent end surface of said core in overlapping locking relation as said cap is progressively engaged threadedly with said housing.

2. Structure as specified in claim 1 in which said housing has a groove formed in its outer surface between said external threads and its line contacting end, and in which said clamp means includes a C-shaped member surrounding a portion of a line to be tapped and having inwardly directed opposing edge portions slidably received by the groove.

References Cited

UNITED STATES PATENTS

| 2,875,777 | 3/1959 | Lacart | 137—318 |
| 3,038,490 | 6/1962 | Yocum | 137—318 |
| 3,162,211 | 12/1964 | Barusch | 137—318 |
| 3,336,936 | 8/1967 | Mullins | 137—234.5 |

WILLIAM F. O'DEA, Primary Examiner.

D. R. MATTHEWS, Assistant Examiner.

U.S. Cl. X.R.

251—146